United States Patent [19]

Nemessanyi

[11] 3,795,408
[45] Mar. 5, 1974

[54] WHEEL AND AXLE SYSTEM FOR LAND VEHICLES

[75] Inventor: Laszlo Nemessanyi, Glen Head, N.Y.

[73] Assignee: Tridair Industries, Redondo Beach, Calif.

[22] Filed: Oct. 30, 1972

[21] Appl. No.: 301,936

Related U.S. Application Data

[63] Continuation of Ser. No. 56,570, July 20, 1970, abandoned.

[52] U.S. Cl............... 280/80 R, 180/76, 192/89 R, 192/99 S, 280/432, 301/126
[51] Int. Cl............................................. B60k 23/06
[58] Field of Search..... 180/76, 77 R; 192/82, 89 R, 192/99 S; 301/1, 126; 280/63, 64, 80 R, 192

[56] References Cited
UNITED STATES PATENTS

| | | | |
|---|---|---|---|
| 3,207,251 | 9/1965 | Putnam et al | 180/76 |
| 2,226,759 | 12/1940 | Fitzner | 180/76 |
| 2,620,235 | 12/1952 | Butler | 301/36 A |
| 2,318,328 | 5/1943 | Nallinger | 192/89 R |
| 961,976 | 6/1910 | Lowry et al | 280/192 |

Primary Examiner—Kenneth H. Betts
Assistant Examiner—John P. Silverstrim
Attorney, Agent, or Firm—Thomas A. Seeman; Arthur W. Fuzak

[57] ABSTRACT

A wheel and rotatable axle system for land vehicles where, when one wheel moves at an angular velocity that is different than the angular velocity of a second wheel, a clutch (1) permits the one wheel to rotate independently of the second wheel, and (2) damps any angular velocity oscillations imposed on the system to return both wheels to the same or substantially the same angular velocity so that "fishtailing" of a land vehicle supported by the wheel and axle system is eliminated.

4 Claims, 7 Drawing Figures

INVENTOR
LASZLO NEMESSANYI ated 3,795,408

WHEEL AND AXLE SYSTEM FOR LAND VEHICLES

This is a continuation of application Ser. No. 56,570, filed July 20, 1970, now abandoned.

BACKGROUND OF THE INVENTION

Land vehicles that are towed as trailers exhibit a characteristic commonly referred to as "fishtailing", particularly when two or more trailers are towed as a train. Fishtailing can be described as a side-to-side oscillation of the trailer vehicle about a reference point which normally is the pivotal steering connection to the next leading trailer or to a tractor vehicle towing the trailer. This oscillation of fishtailing becomes predominant when the trailer, and particularly a trailer train, is towed out of a curve. Certain trailers in a trailer train being towed out of a curve are either over steered or under steered so that the steering forces become unbalanced. The unbalanced steering forces generate ever increasing oscillations of the trailer train, particularly where the train accelerates during this unbalanced condition.

OBJECTS OF THE INVENTION

Accordingly, it is an object of the invention to provide a new and improved wheel and rotatable axle system.

It is an object of the invention to provide a wheel and rotatable axle system to damp oscillations developed in the system by angular velocity differences between paired wheels of the system.

SUMMARY OF THE INVENTION

Briefly, in accordance with the invention, a wheel and rotatable axle system is provided having one wheel fixed to a unit axle and a second wheel releasably fixed by a friction-engagement means to the unit axle where the friction engagement means can be overcome at a predetermined torque moment so that the second wheel rotates relative to rather than with the unit axle-first wheel, and the friction-engagement means further damps angular velocity oscillations between the wheels so that fishtailing of a land vehicle supported by the wheel and axle system is eliminated.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
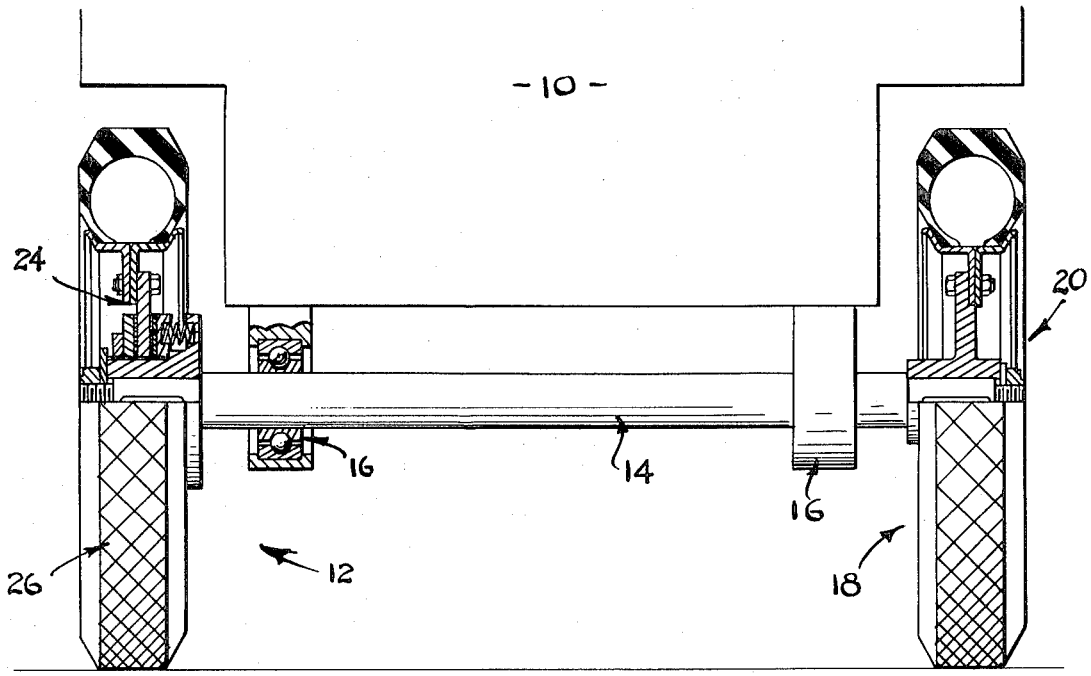
FIG. 1 is an elevation view, partly sectional and broken away, of one wheel and axle system formed in accordance with the invention as positioned with a land vehicle.

A land vehicle such as a trailer 10 is shown schematically by FIG. 1 with one form of wheel and rotatable axle system 12 of the invention. The rotatable axle 14 of the system is rotatably positioned through similar journal bearings 16 housed within the undercarriage of the trailer. Wheel 18 is connected directly to the axle 14 by a conventional spline-and-nut arrangement 20 so that wheel 18 and axle 14 rotate together as a wheel-axle unit.

The wheel and axle system 12 has an axial clutch assembly 24 which functions as both a damping and friction engagement connector between the wheel 26 and axle 14. While an axial clutch is illustrated, it is contemplated that a radial clutch or other selective engagement assembly can also be used. Axial clutch 24 releasably connects wheel 26 to axle 14 so that wheel 26 can rotate at an angular velocity different than wheel 18 when a predetermined torque moment is developed that overcomes the friction engagement of clutch 24 so that the clutch slips and the energy of the torque moment is absorbed and dissipated as heat energy by the clutch.

Where it becomes desirable to selectively release the clutch 24—for example, when a trailer is to be moved along a non-linear track—a clutch release means can be provided for the clutch, such as that shown by FIGS. 2 and 3 as described hereinafter.

Figure 2:
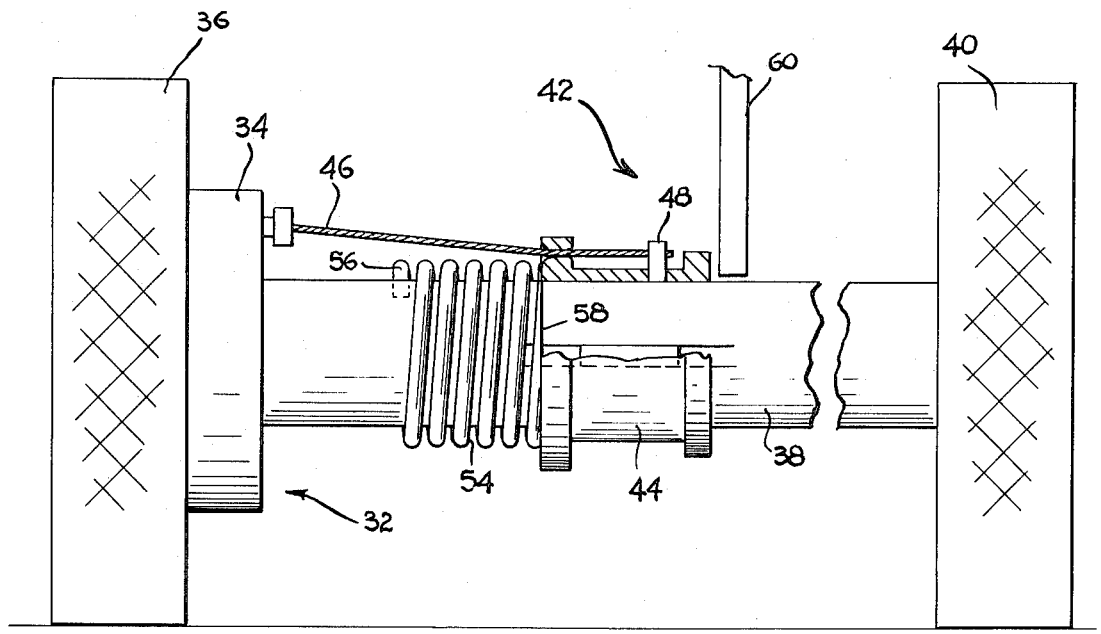
FIG. 2 is an elevation view, partly sectional and broken away, of another wheel and axle system.
Figure 3:
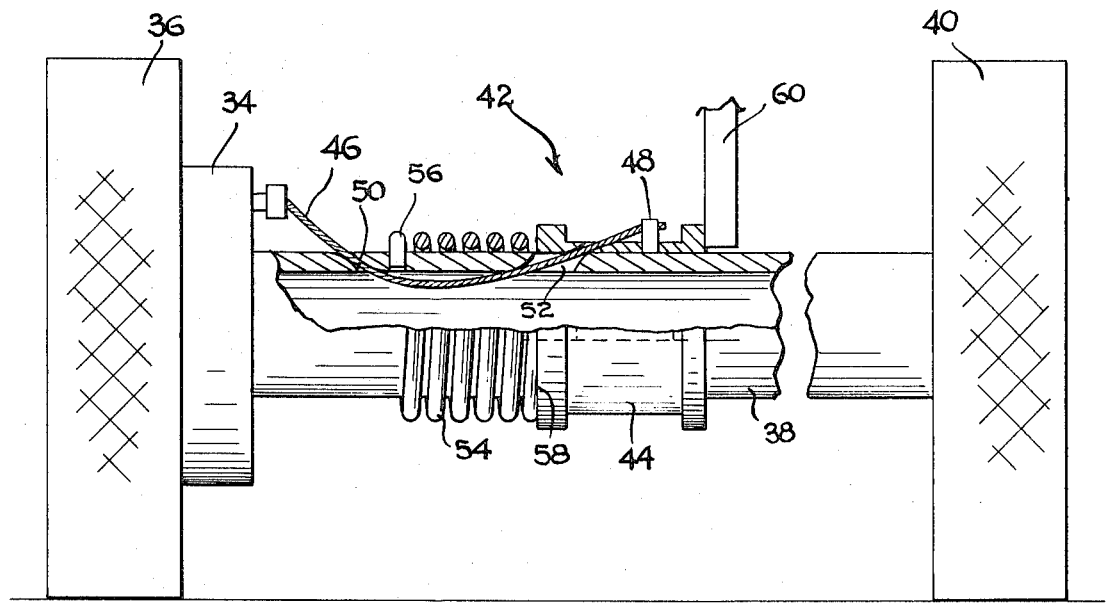
FIG. 3 is an elevation view, partly sectional and broken away, of another wheel and axle system similar to the system of FIG. 2.

FIG. 2 illustrates another wheel and rotatable axle system 32 that is functionally similar to the wheel and axle system 12 of FIG. 1. The wheel and axle system 32 has a radial clutch 34 that releasably connects wheel 36 to rotatable axle 38. Wheel 40 is connected directly to axle 38 and is rotatable therewith as a wheel-axle unit.

The clutch 34 of the wheel and axle system 32 is maintained in selective engagement to connect wheel 36 to the axle 38 by means of a clutch actuator system 42. The clutch actuator system 42 has a sleeve 44 that fits around the outer surface of the axle 38 and slides axially therealong. A cable 46 is connected between the radial clutch 34 and the sleeve 44 where one end of the cable is secured by an adjustment pin 48. The length of the cable 46 can be readily adjusted by the adjustment pin 48. In FIG. 2, the cable 46 extends directly between the radial clutch 34 and the sleeve 44, while in FIG. 3, where like parts as described and shown by FIG. 2 are identified by the same reference characters, the cable passes through suitable ports 50 and 52 so that a portion of the cable lies within the hollow axle 38. It is contemplated that other cable arrangements can also be utilized to affect the desired connection between the radial clutch and the movable sleeve.

A coil spring 54 is clamped to the axle 38 at the spring end 56 and bears against sleeve 44 at spring end 58. The coil spring 54 continuously urges the sleeve 44 axially away from the wheel 36 and thereby maintains a desired tension load on cable 46 to engage radial clutch 34 and connect wheel 36 to axle 38. Spring 54 can be overcome by physically advancing sleeve 44 axially toward wheel 36; for example, by a release lever 60 that can be brought to bear against the sleeve 44 and displace the sleeve in the direction of wheel 36. As sleeve 44 is displaced, the constant tension load on cable 46 is removed and radial clutch 34 disengaged so that wheel 36 is free to rotate at an angular velocity that is different than the angular velocity of wheel 40.

Operatively, when the trailer 10 of FIG. 1 moves in a straight line with the axis of rotation of the wheel and rotatable axle system 12 perpendicular to the line of motion, the wheels 18 and 26 are interconnected by the rotating axle 14 and engaged clutch 24, and rotate at the same angular velocity. This is schematically shown by FIG. 4a and 4d.

Figures 4A, 4B, 4C, 4D:
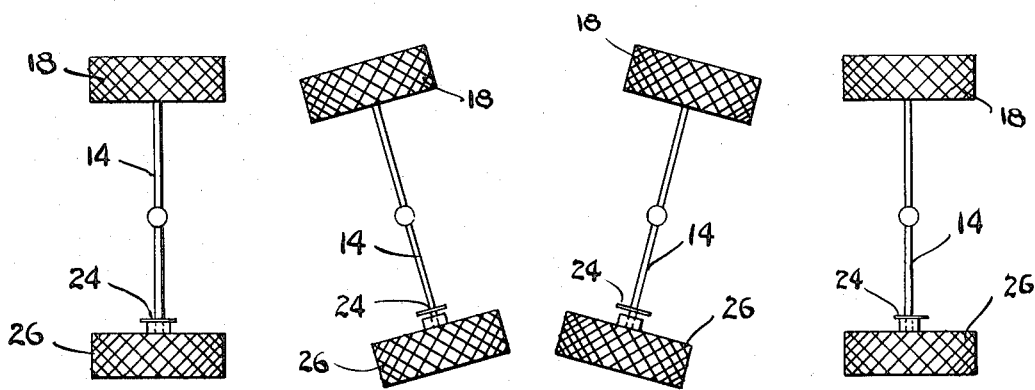
FIG. 4 is a schematic view of the wheel and axle system in a sequence of positions exhibiting system oscillations.

A wheel-and-axle system schematically shown by FIG. 4b and 4c moving along a non-linear track, such as a curved line, forces one wheel to rotate at an angular velocity that is different than the angular velocity of the other wheel. In the wheel-and-rotatable axle system of my invention, either clutch 24 of FIG. 1 or clutch 34 of FIGS. 2 and 3 absorb or damp a portion of the energy developed by the unbalanced forces. The clutch, therefore, in my invention absorbs and damps the energy of the oscillating masses, i.e., wheels, so that oscillations of the wheel-and-axle system and of a land vehicle supported thereby are substantially eliminated and the vehicle is stablized.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A wheel and axle system for a land vehicle, the wheel and axle system comprising:
   a. first and second rotatable wheels engaging a load-bearing surface through a rolling friction contact,
   b. a rotatable axle joining said first and second rotatable wheels in a spaced relationship,
   c. means connecting said first wheel to said axle so that said first wheel is rotatable with said axle,
   d. engagement means releasably connecting said second wheel to said rotatable axle, said engagement means damping any angular velocity oscillation developed between said first and second wheels and releasing at a predetermined force level so that said second wheel is free to rotate at an angular velocity different than the angular velocity of said wheel and rotatable axle unit,
   e. said engagement means including clutch means releasably connecting said second wheel to said rotatable axle and clutch actuator means selectively developing the predetermined force level and releasing said clutch means; and
   f. said clutch actuator means coacts with said rotatable axle and includes sleeve means adapted to engage the rotatable axle, cable means adjustably connected from said clutch means to said sleeve means, and means continuously urging said sleeve means in a first direction so that said cable means maintains said clutch means in said connecting relationship.

2. The wheel and axle system of claim 1 in which said means continuously urging said sleeve means in a first direction is defined as a spring means.

3. The wheel and axle system of claim 1 in which said rotatable axle is hollow and suitably ported to receive a portion of said cable means therethrough.

4. The wheel and axle system of claim 1 in which said actuator means further includes a release means selectively urging said sleeve means in a second direction so that said cable means releases said clutch means from said connecting relationship.

* * * * *